US009840215B2

(12) United States Patent
Wubs

(10) Patent No.: US 9,840,215 B2
(45) Date of Patent: Dec. 12, 2017

(54) TORSION BAR AND LIFT ASSIST FOR PIVOTALLY MOUNTED VEHICLE BUMPERS INCORPORATING SAME

(71) Applicant: Magnum Trailer and Equipment Inc., British Columbia (CA)

(72) Inventor: Gerald Peter Wubs, Sardis (CA)

(73) Assignee: Magnum Trailer and Equipment Inc., Abbotsford, British Columbia (CA)

(*) Notice: Subject to any disclaimer, the term of this patent is extended or adjusted under 35 U.S.C. 154(b) by 0 days.

(21) Appl. No.: 15/123,365

(22) PCT Filed: Mar. 2, 2015

(86) PCT No.: PCT/CA2015/000145
§ 371 (c)(1),
(2) Date: Sep. 2, 2016

(87) PCT Pub. No.: WO2015/131275
PCT Pub. Date: Sep. 11, 2015

(65) Prior Publication Data
US 2017/0072888 A1    Mar. 16, 2017

(30) Foreign Application Priority Data

Mar. 3, 2014   (CA) .................................... 2845157

(51) Int. Cl.
*B60R 19/38*       (2006.01)
*F16F 1/14*        (2006.01)
(Continued)

(52) U.S. Cl.
CPC ............ *B60R 19/38* (2013.01); *B60R 19/023* (2013.01); *B60R 19/52* (2013.01); *F16F 1/14* (2013.01); *B60R 2019/522* (2013.01)

(58) Field of Classification Search
CPC ......... B60R 19/38; B60R 19/46; B60R 19/52; F16F 1/14
(Continued)

(56) References Cited

U.S. PATENT DOCUMENTS 514,076 A    2/1894  Hotz
2,740,487 A  4/1956  Murty et al.
(Continued)

OTHER PUBLICATIONS

International Search Report on Patentability and Written Opinion, PCT/CA2015/000145, dated Jun. 3, 2015.

*Primary Examiner* — Jason S Morrow
(74) *Attorney, Agent, or Firm* — Shlesinger, Arkwright & Garvey LLP

(57) ABSTRACT

A lift assist for a bumper pivotally mounted to a vehicle frame for movement between a normally closed upright position and a forwardly projecting open position. The bumper may be an animal protection bumper fitted to a heavy duty truck. The lift assist includes a torsion bar comprising a relatively short length of wire rope extending between first and second end fittings of the torsion bar, a first anchor assembly for securing the first end fitting to the bumper, and a second anchor assembly for securing the second end fitting to the vehicle frame. The second anchor assembly restrains rotational movement of the second end fitting when a torquing force is applied to the torsion bar, at the same time permitting contraction of the length of the wire rope when a torquing force is applied.

23 Claims, 6 Drawing Sheets

(51) Int. Cl.
*B60R 19/52* (2006.01)
*B60R 19/02* (2006.01)

(58) Field of Classification Search
USPC ............... 293/112, 115, 118, 145; 267/273
See application file for complete search history.

(56) References Cited

U.S. PATENT DOCUMENTS

| | | |
|---|---|---|
| 2,864,121 A | 12/1958 | Imber et al. |
| 2,951,548 A | 9/1960 | Crockett et al. |
| 3,146,847 A | 9/1964 | Rutman et al. |
| 3,295,809 A | 1/1967 | Smola et al. |
| 3,380,773 A | 4/1968 | Sewelin |
| 4,915,340 A | 4/1990 | Nawa et al. |
| 4,976,417 A * | 12/1990 | Smith ............... B60G 11/188 267/154 |
| 4,984,776 A | 1/1991 | Smith |
| 5,000,430 A * | 3/1991 | Smith ............... F16F 1/366 267/148 |
| 5,009,405 A * | 4/1991 | Smith ............... B60G 11/188 24/68 E |
| 5,120,032 A | 6/1992 | Smith |
| 7,395,738 B1 | 7/2008 | Nelson |
| 2004/0164472 A1* | 8/2004 | Kobelev ............ F16F 1/14 267/160 |
| 2009/0212581 A1* | 8/2009 | Drever ............... B60R 19/52 293/115 |
| 2017/0136972 A1* | 5/2017 | Drever ............... B60R 19/52 |

* cited by examiner

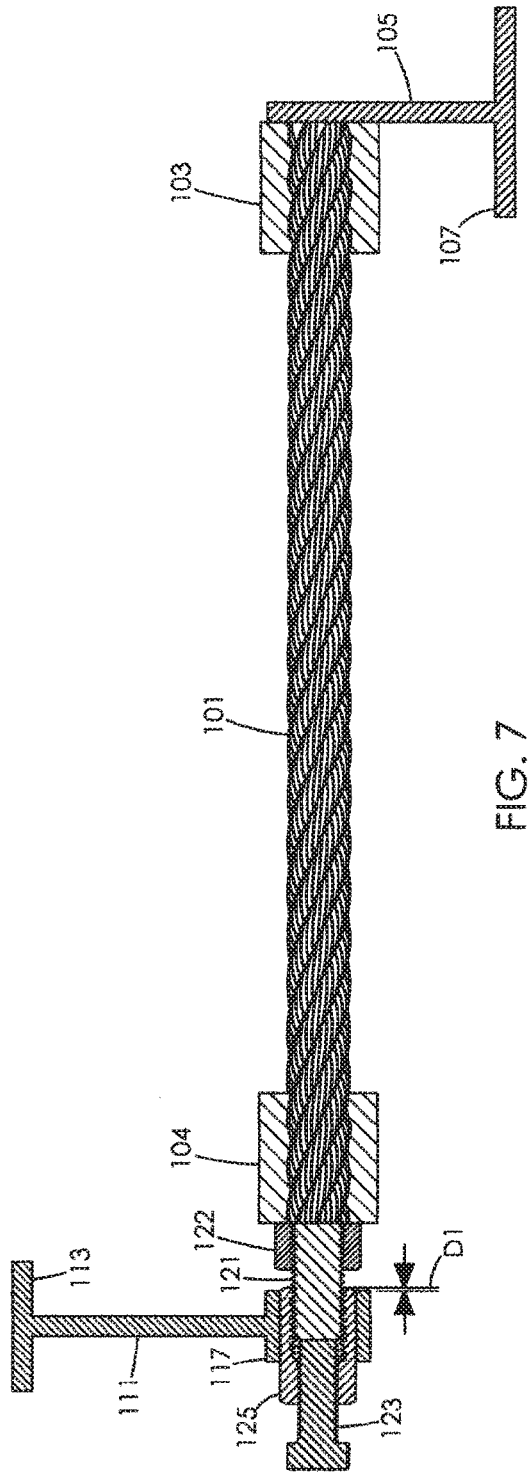
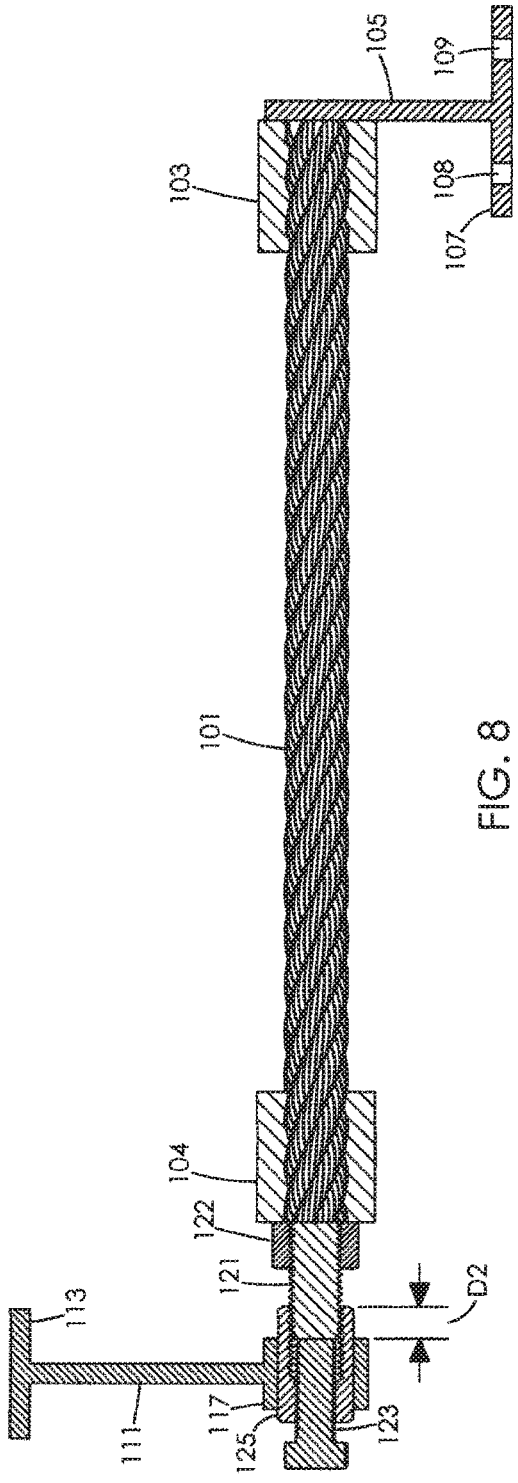

TORSION BAR AND LIFT ASSIST FOR PIVOTALLY MOUNTED VEHICLE BUMPERS INCORPORATING SAME

BACKGROUND OF THE INVENTION

The present invention relates to torsion bars and to vehicle bumpers incorporating same. Implementation of the invention is especially suited for but not limited to pivotally mounted vehicle bumpers designed to remove large animals from the path of a moving vehicle.

The risk of damage caused by collisions with animals such as moose, deer, elk, and other large animals is particularly serious for vehicles such as tractor-trailer and other heavy duty trucks which often move along roads at high speeds. They are unable to stop or navigate quickly within a short distance and collisions with animals are sometimes unavoidable. To address this risk, the result has been a number of front end bumper designs which are variously described as animal protection bumpers, grille guards, moose bumpers, bull bars, elk pushers, roo bars, etc.

Because of the massive forces which can be generated in a collision with a large animal, a suitable animal protection bumper must be strong and is typically quite heavy. In the case of heavy duty tractor-trailer trucks where access to the vehicle engine is often gained by tilting the engine hood forwardly, the bumper is pivotally mounted to the vehicle frame. This enables the bumper to be lowered or pivoted from its normally closed upright position to an open position extending forwardly from the frame. When the bumper is in the open position, the hood can be tilted forwardly without interference from the bumper. The engine and other components carried under the hood can then be serviced by the truck driver or other worker.

Both the lowering of a pivotally mounted bumper from its closed position to its open position and the subsequent raising of the bumper back to its closed position pose a risk of injury to the back. This can be so not only in normal conditions, but particularly so in conditions where the bumper is heavy and the worker's footing is poor as, for example, on icy, snowy or muddy surfaces. By way of example, the weight of the tilting portion of a pivotally mounted bumper for a heavy duty truck may approximate 220 pounds. While the weight distribution may be concentrated towards the pivot axis of the bumper, a worker nevertheless may be required to exert a significant lifting force (e.g. 85 pounds or more) to lower the bumper in a controlled manner to its open position or to raise it back to its closed position.

Therefore, there exists a need for a lift assist that reduces the force which is required to be exerted by a worker when raising or lowering a pivotally mounted vehicle bumper, thereby reducing the risk that a back injury may occur. Preferably, the assist should be robust, should not involve undue mechanical complexity, and should be relatively compact. Compactness is desirable because the available space for installation may be limited.

BRIEF SUMMARY OF THE INVENTION

In one aspect of the present invention, there is provided a lift assist for a bumper pivotally mounted to a vehicle frame for movement between a normally closed upright position and a forwardly projecting open position. The lift assist includes a torsion bar comprising a length of wire rope extending along the torsion bar axis between first and second end fittings, a first anchor assembly for securing the first end fitting to the bumper, and a second anchor assembly for securing the second end fitting to the vehicle frame.

When the first and second anchor assemblies are secured to the bumper and vehicle frame, respectively, the first anchor assembly in cooperation with the second anchor assembly functions to transmit a torquing force from the bumper to the torsion bar in response to pivotal movement of the bumper between its closed and open positions. Cooperatively, the second anchor assembly functions to restrain rotational movement of the second end fitting when the torquing force is applied. Also, the second anchor assembly importantly permits contraction of the length of the wire rope when the torquing force is applied.

Preferably, the end fittings of the wire rope torsion bar are swage fittings. These are mechanically simple, relatively low cost fittings. Suitable first and second anchor assemblies functioning in the manner described above can easily be connected with such fittings (e.g. by welding).

The use of wire rope as part of a torsion bar is considered to be a significant feature. This feature recognizes that a length of wire rope per se is a relatively low cost item which can exhibit useful torsionally resilient characteristics. More particularly, it has been found that a relatively short length of wire rope can be axially twisted through an angle upwards of 90 degrees and provide a resilient return force. Normally, wire rope is used under tension in applications where it is desired to hoist or pull an object, or to arrest movement of an object. It is considered undesirable to subject the rope to torsional forces and desirable to alleviate such forces. Unless alleviated, such forces can lead to unwinding or knotting and ultimately to undesirable permanent deformation of the rope. The wire rope feature of the present invention takes advantage of the resilient torsional characteristics of the rope.

To better avoid permanent deformation, the length of the wire rope between the end fittings preferably does not substantially exceed 16 times the diameter of the rope. Preferably, the diameter of the rope is substantially within the range of ⅞ inches to 1⅜ inches. Beyond this, it may be found that deformation still can be avoided by enclosing the rope within a tubular constraint. However, the use of such a constraint will undesirably add to overall cost—and the resulting length may not be fittable within available space.

In another aspect of the present invention, the torsion bar is adjustably preloadable to provide an angular return force in the direction of the bumper's closed position. Preferably, the preload mechanism is embodied in the second anchor assembly.

In one embodiment, the second anchor assembly preferably includes an externally threaded stud axially aligned with the torsion bar axis and secured to the second end fitting; a torque locking block; an adjustment screw; and a support arm securable to the vehicle frame. The support arm includes a collar for holding the locking block in a manner permitting sliding movement of the block within the collar along while restraining rotational movement.

The locking block comprises first and second internally threaded bores extending into opposed ends of the block, each bore being axially aligned with the torsion bar axis. The bores axially communicate with each other. The first bore is for threadably receiving the threaded stud. The second bore is for threadably receiving the adjustment screw. Preferably, the threading of the first bore is relatively coarse and the threading of the second bore is relatively fine. The adjustment screw has a length sufficient to extend through the second bore into the first bore to an adjustable point in the first bore limiting threading movement of the stud into the first bore.

The foregoing and other features and advantages of the present invention will become further apparent from the following detailed description read in conjunction with the accompanying drawings. The detailed description and drawings are to be regarded as illustrative of the disclosure, rather than as limiting the scope of the invention as defined by the appended claims.

BRIEF DESCRIPTION OF THE DRAWINGS

FIG. 7 is a front elevation view of the lift assist, partially in cross-section showing the position of an adjustment screw prior to preloading of the torsion bar.

FIG. 8 is a front elevation view similar to FIG. 7, but showing the position of the adjustment screw when the torsion bar is preloaded.

DETAILED DESCRIPTION OF THE INVENTION

Figure 1:
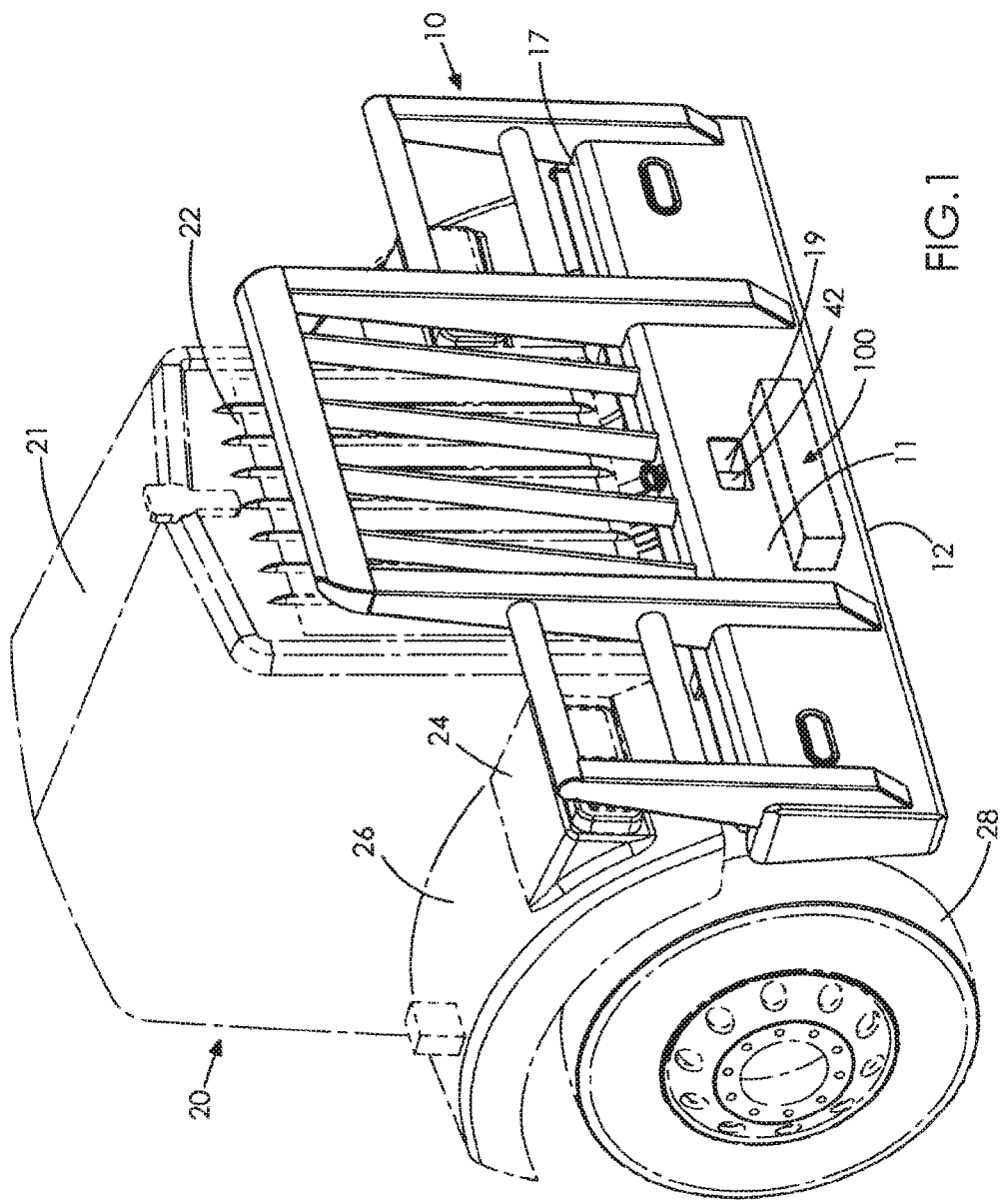
FIG. 1 is a perspective view of the front end of a heavy duty truck equipped with a bumper that is pivotal between closed and open positions, the bumper being shown in its upright or closed position.
Figure 2:
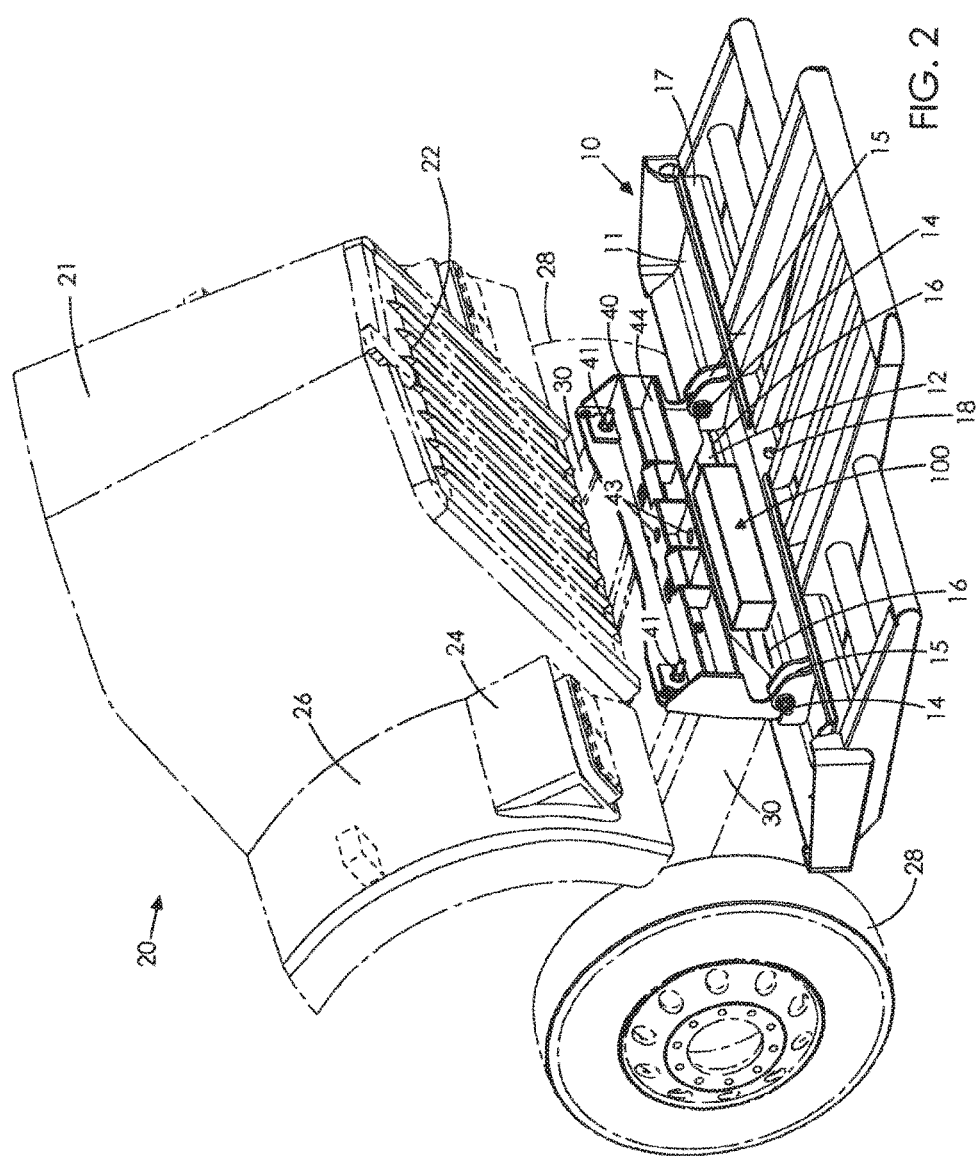
FIG. 2 is a perspective view showing the bumper in FIG. 1 in a forwardly projecting open position to allow the engine hood of the truck shown in FIG. to be tilted forwardly

Referring now to FIGS. 1 and 2, there is shown an animal protection bumper generally designated 10 pivotally mounted to the front end of a heavy duty truck generally designated 20. The truck includes an engine hood 21 and is of the type where the hood must be tilted forwardly to gain access to the engine (not shown) and other parts under the hood (e.g. radiator, etc.—also not shown). The truck also includes a grille 22, headlights 24, fenders 26, and tires 28, any or all of which parts together with hood 21 may suffer significant damage in the event the vehicle collides with a large animal when not protected by the bumper. The bumper serves to avoid or minimize such damage. As is typical, grille 22, headlights 24 and fenders 26 tilt with hood 21.

FIG. 1 illustrates bumper 10 in its normally closed upright position. FIG. 2 illustrates the bumper after having been pivoted to a forwardly extending open position. In the latter position, hood 21 may be tilted forwardly.

Apart from the addition of lift assist 100 to be described below, bumper 10 is basically a conventional design, and it is mounted to truck 20 in a conventional manner. It includes a lower face plate 11, a lower flange 12 extending rearwardly from the face plate, and an upper flange 17 also extending rearwardly from the face plate. A hole 18 (best seen in FIGS. 2 and 3) extends through upper flange 17 for receiving a tow pin 42 (seen only in FIG. 1 through opening 19 in face plate 11). Bumper 10 also includes vertically and horizontally extending interconnected cross-members extending above lower face plate 11 to shield hood 21, grille 22, headlights 24 and fenders 26 from unwanted impacts.

In FIG. 2, hood 21 and connected components (grille 22 etc.) have been tilted forward to a limited degree (i.e. about 40 degrees). With some trucks, the tilt may be up to 90 degrees. For the purpose of illustration, a 90 degree tilt is not shown in FIG. 2 because this would mask various details of construction which appear in FIG. 2. Otherwise, it will be seen in that bumper 10 is carried by a steel sub-frame or framework 40 secured by couplings 41 (only two of which are shown) to main frame 30 of truck 20. Framework 40 is basically an extension retrofitted to mainframe 10 and is considered to be part of the overall vehicle frame.

In more detail, bumper 10 is connected to opposed sides of framework 40 by a pair of pivot pins 14 secured by brackets 15 to bumper face plate 11. These pins permit pivotal movement of the bumper about pivot axis 16 shown in FIG. 2. When in its upright position, bumper 10 is also connectable with framework 40 by means of tow pin 42 noted above when the pin is inserted through hole 18 and thence through aligned holes 43 in the structure of framework 40.

In a representative manner, FIGS. 1 and 2 indicate the relative size and positioning of a bumper lift assist 100 in accordance with the present invention. As will be appreciated from these figures, the lift assist is compact. The space which it occupies is relatively small and confined behind face plate 11 of bumper 10. The scale of FIGS. 1 and 2 is too small to show structural details of the lift assist. But, such details are shown in FIGS. 3 to 8

Figure 3:
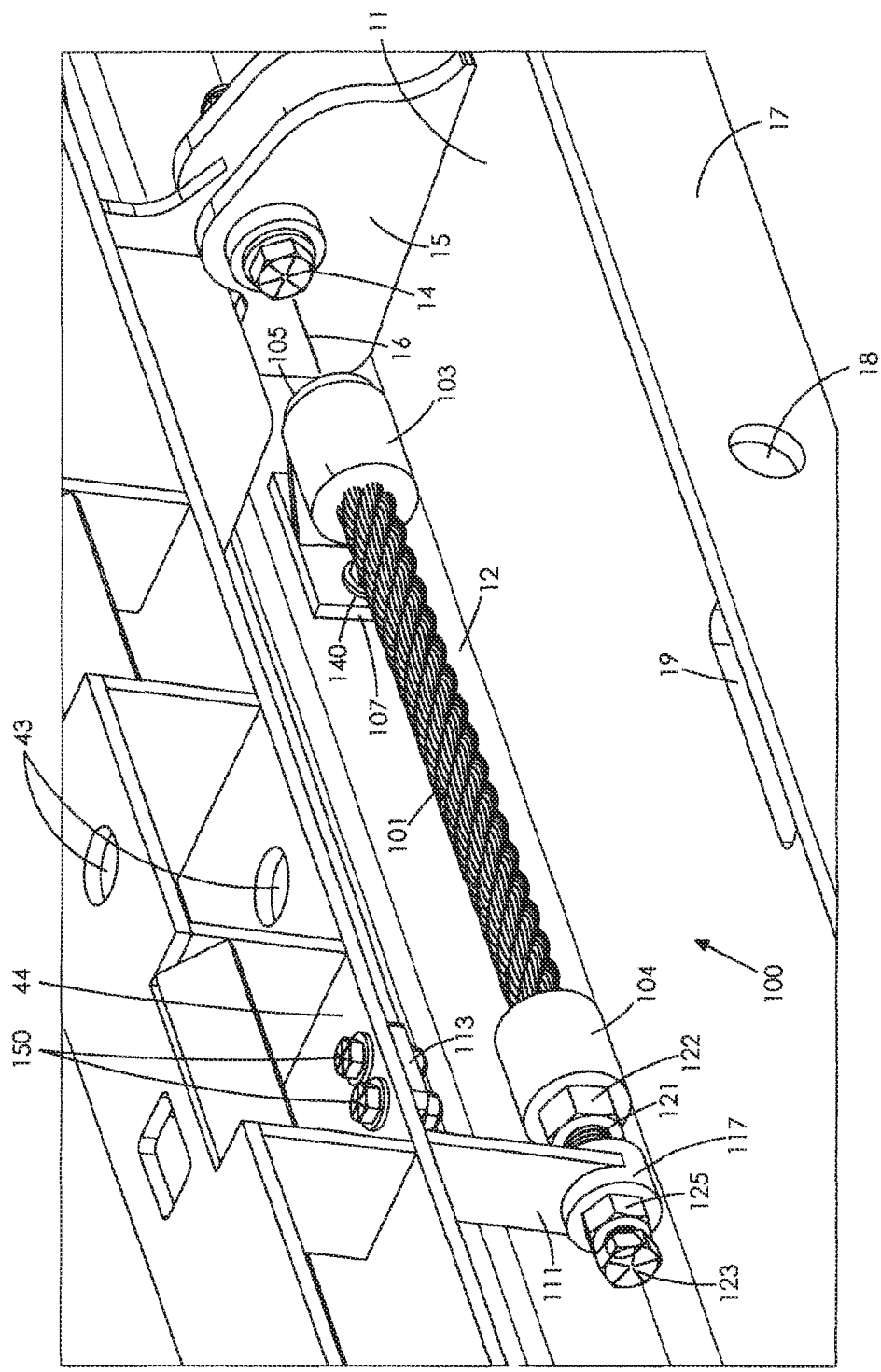
FIG. 3 is an enlarged fragmentary view of a part of FIG. 2 showing structural details of the lift assist and its installation.
Figure 4:
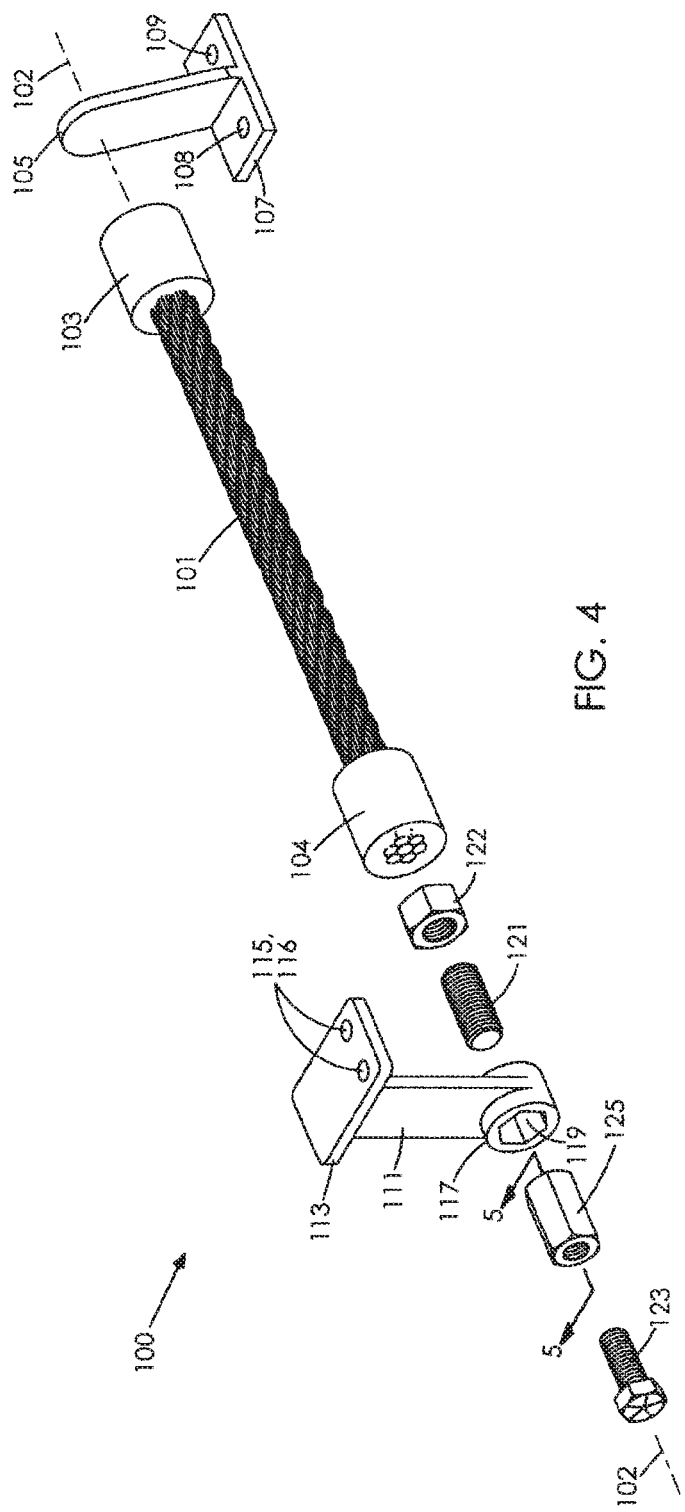
FIG. 4 is an exploded perspective view of the lift assist shown in FIG. 3, when not installed.

Referring now to FIGS. 3 to 8, lift assist 100 includes a torsion bar comprising a length of wire rope 101 extending between swage end fittings 103, 104. The bar extends along torsion bar axis 102 shown in FIG. 4. When the lift assist is installed as shown in FIG. 3, axis 102 is preferably aligned with pivot axis 16 of bumper 10. Excessive misalignment may impose undesirable stresses on the wire rope and other components of the lift assist.

Wire rope 101 has a right hand lay. It is a standard piece of IWRC steel wire rope having a multiwired steel core and a plurality of multiwired steel wire strands (in the present case, six strands) helically wound about the core. Note that IWRC is an industry acronym for "independent wire rope core". End fittings 103, 104 are also formed from steel. It will be understood by those skilled in the art that the wire rope could equally have a left hand as opposed to a right hand lay. Further, it will be understood that the core may be a fibrous or other core, or no core, as opposed to a core comprised of steel wires.

Lift assist 100 further includes first and second anchor assemblies. The first anchor assembly comprises a support arm 105 and a flange 107 which are cast as a single part, then welded to end fitting 103. Flange 107 includes bolt holes 108, 109. When the lift assist is installed as shown in FIG. 3, flange 107 is bolted to bottom flange 12 of bumper 10 by means of a pair of bolts 140 (only part of one of which is shown) extending through bolt holes 108, 109 in flange 107.

The second anchor assembly comprises an externally threaded stud 121 which is axially aligned with torsion bar axis 102 and secured to end fitting 104 by means of a stud nut 122 welded to the fitting, a support arm 111, an adjustment screw 123, and a torque locking block 125.

Support arm 111 is cast as a single part. It includes a flange 113 at its proximal end and a collar 117 at its distal end. Flange 113 includes a pair of bolt holes 115, 116. When the lift assist is installed as shown in FIG. 3, flange 113 is bolted to cross-member 44 of framework 40 by means of a pair of bolts 150.

Collar 117 has a hexagonal bore 119 extending through the collar in alignment with torsion bar axis 102. Torque locking block 125 has an outer hexagonal shape and is slidingly held within the bore/collar for movement along axis 102, pivotal or rotational movement within the bore/collar being restrained.

Figure 5:
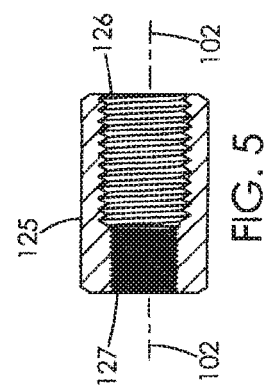
FIG. 5 is an enlarged cross-sectional view of the torque locking block forming part of the lift assist shown in FIGS. 3 and 4.
Figure 6:
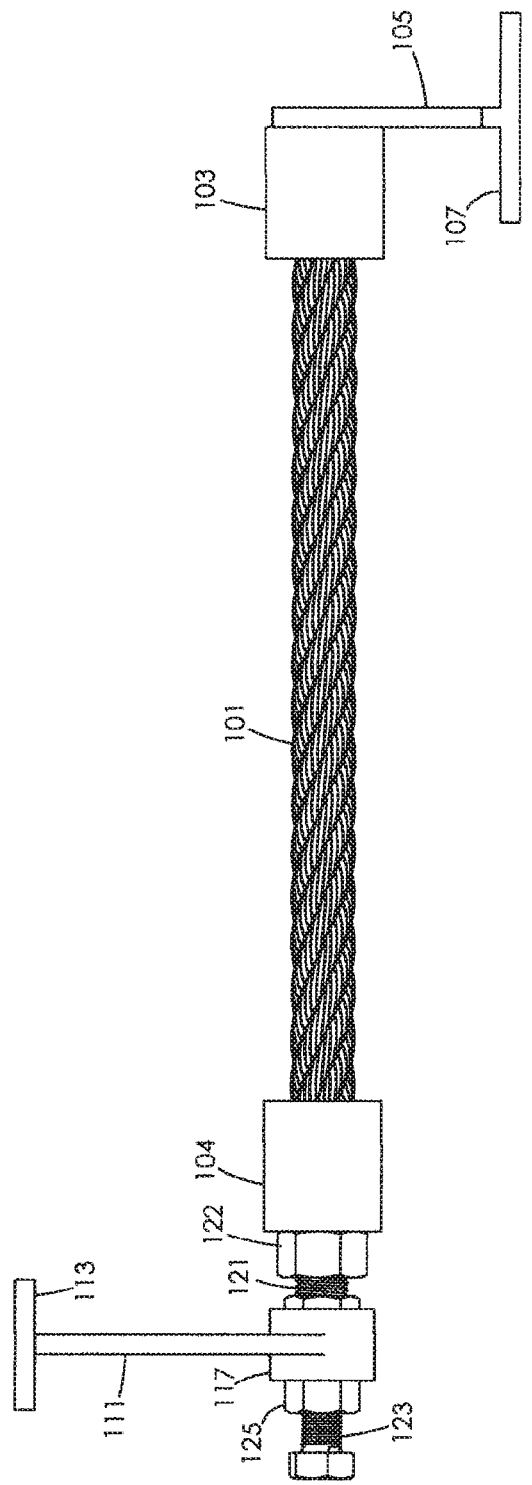
FIG. 6 is a front elevation view of the lift assist shown in FIG. 5, when assembled.

Torque locking block 125 together with adjustment screw 123 are important components of the present embodiment. They facilitate preloading of the torsion bar, the primary operative component of which is wire rope 101. As best seen in FIG. 5, torque locking block 125 comprises a first bore 126 with a relatively coarse thread and a second bore 127 with a relatively fine thread. The bores are axially aligned with torsion bar axis 102. Stud 121 which has a left hand thread is threadably received by bore 126. Adjustment screw 123 which has a right hand thread is threadably received by bore 127. The bores communicate with each other and, as best seen in FIGS. 7 and 8, screw 123 has a length sufficient to extend through bore 127 into bore 126 to an adjustable point which limits threading movement of the stud into bore 126.

Advantageously, the torsion bar and particularly wire rope 101 thereof is preloadable. Without preloading, the torsion bar will provide a limited return force between the open and closed positions of bumper 10. But, a significantly greater return force will be enabled if the torsion bar and particularly wire rope 101 is preloaded with a bias towards the bumper's closed position.

Preloading the torsion bar is a potentially dangerous task and should be carefully approached. With lift assist 100 installed as shown in FIG. 3 and bumper 10 in its closed position as shown in FIG. 1, the job can be done by a worker positioned under truck 50 where there is access to the lift assist from below and behind. At first instance, adjustment screw 123 is threaded into torque block 125 until it just touches stud 121 as shown in FIG. 7. Then, a wrench is applied to stud nut 122, and the nut is turned in the direction that bumper 10 closes. This increases the twist in wire rope 101.

Due to space constraints, the travel of the wrench may be limited. When the end of available wrench movement is reached, that position should be held, and adjustment screw 123 should be threaded inwardly into torque lock block 125, then tightened with a second wrench. It can be helpful to have a co-worker present to tighten the adjustment screw. Once the screw has been tightened, the hold on the wrench can be relaxed and a new purchase can be made on stud nut 122 to continue the preload operation.

The foregoing steps are repeated until stud nut 122 has been adjusted (tightened) approximately 60° from its initial position prior to preloading.

At this point the worker(s) should clear the underside of the truck, and the bumper should be opened. Then, the preload of lift assist 100 is checked by allowing bumper 10 to lower towards its fully open position. If the bumper reaches that position, but is relatively heavy to lift from that position, then the lift assist should be further preloaded. If the bumper reaches the fully open position and balances or closes with a light force, then the preload operation is complete.

If the bumper does not fully open under its own weight, no attempt should be made to force it down. Rather adjustment screw 123 should be loosened slightly, and the balance rechecked. It is not necessary to apply a force to stud nut 122 when loosening the screw, but the torque to loosen will be quite high. An extension on the wrench may be used to loosen the screw 123 more easily.

FIG. 8 indicates the position of adjustment screw 123 after preloading has been completed. Its position has advanced into torque locking block 125 from the position shown in FIG. 7. Concurrently, torque locking block 125 has been slidingly drawn a distance D2 through collar 117 (compare with distance D1≈0 in FIG. 7)

Unloading lift assist 100 is done by fully loosening the adjusting screw 123. As noted above, it is not necessary to use a wrench on stud nut 122 during unloading.

In an experimental case where a lift assist similar to that described above was constructed and installed on a truck 20, the bumper 10 was about 8 feet in width, 5 feet in height, and weighed about 220 pounds. The preload applied to the torsion bar was about 280 foot pounds, the diameter of wire rope 101 being about 1.25 inches and its length between fittings 103, 104 being about 16 inches. It was found that the force required to lift the bumper upwardly from its fully open position was only 15 pounds. In the fully open position, the degree of rotation was about 90° and not merely to the partially open position shown in FIG. 2. It may also be noted that stud 121 had a diameter of 1 inch and a length of 1.375 inches protruding from stud nut 122 with 8 threads per inch; adjustment screw 123 had a diameter of 0.750 inches and a length of 2 inches with 16 threads per inch.

The use of a coarse thread for stud 121 and cooperatively within bore 126, and the use of a fine thread for adjustment screw 123 and cooperatively within bore 127, is a significant feature. Because the stud has a coarse thread, the ratio of its advance to the degree of its rotation is high. When torque is applied, stud 121 tends to screw into torque locking block 125 (bore 126). Screw 123 provides a stop which holds back the stud's advance. But, having a fine thread, its ratio of retreat to the degree of its rotation is low. For the screw to retreat and allow the stud to advance, it must make more revolutions than the stud. For example, in the experimental case noted above, the stud with 8 threads per inch must make one revolution in order to advance 0.125 inches. But, for the screw to retreat and allow such an advance, the screw with 16 threads per inch must make two revolutions. As the end face of the stud bears against the end face of the screw there is friction between the faces. The stud tries to advance twice as far as the screw will allow for the same amount of rotation. In other words, the stud bears harder and harder against the screw until the force is equalized by compression and friction forces of the stud and the screw against each other, and the screw threads in the torque locking block 125.

It should be understood that workable results can be achieved without the employment of coarse and fine threads. Both stud 121 and screw 123 may have coarse threads.

The scope of the claims should not be limited by the foregoing example, but should be given the broadest interpretation consistent with the description as a whole.

The invention claimed is:

1. A lift assist for a bumper pivotally mounted to a vehicle frame for movement between a normally closed upright position and a forwardly projecting open position, said lift assist comprising:
   (a) a torsion bar comprising a length of wire rope extending along a torsion bar axis between first and second end fittings;
   (b) first and second anchor assemblies;
   (c) said first anchor assembly for securing said first end fitting to said bumper, and, in cooperation with said second anchor assembly, for transmitting a torquing force from said bumper to said torsion bar in response to pivotal movement of said bumper between said closed and open positions; and, (d) said second anchor assembly for securing said second end fitting to said vehicle frame, and for restraining rotational movement of said second end fitting when said torquing force is transmitted to said torsion bar, said second anchor assembly permitting contraction of the length of said wire rope in response to said torquing force.

2. A lift assist as defined in claim 1, wherein said torsion bar is adjustably preloadable for applying to said bumper an angular return force towards said closed position when said first end fitting is secured to said bumper and said second end fitting is secured to said frame as aforesaid.

3. A lift assist as defined in claim 2, wherein said wire rope has a defined length and a defined diameter, said length not substantially exceeding sixteen times said diameter.

4. A lift assist as defined in claim 3, wherein said diameter is substantially within the range of ⅞ inches to 1⅜ inches.

5. A lift assist as defined in claim 1, wherein said second anchor assembly comprises:
(a) an externally threaded stud axially aligned with said torsion bar axis and secured to said second end fitting;
(b) an adjustment screw;
(c) a torque locking block comprising first and second internally threaded bores extending into opposed ends of said block, each bore being axially aligned with said torsion bar axis,
  (i) said first and second bores axially communicating with each other;
  (i) said first bore for threadably receiving said stud;
  (ii) said second bore for threadably receiving said screw; and,
  (iii) said screw having a length sufficient to extend through said second bore into said first bore to an adjustable point limiting threading movement of said stud into said first bore; and,
(d) a support arm securable to said vehicle frame, said support arm including a collar for holding said locking block in a manner permitting sliding movement of said block within said collar along said torsion bar axis while restraining pivotal movement of said block within said collar about said axis.

6. A lift assist as defined in claim 5, wherein said stud has a predetermined left hand or right hand thread and wherein said screw has a left hand or right hand thread opposite to that of said stud.

7. A lift assist as defined in claim 6, wherein the thread of said first bore is relatively coarse and the thread of said second bore is relatively fine.

8. A lift assist as defined in claim 1, wherein said first and second end fittings are swage fittings.

9. In combination with a vehicle having a bumper mounted to a frame of the vehicle for pivotal movement between a normally closed upright position and a forwardly projecting open position, a lift assist comprising:
(a) a torsion bar comprising a length of wire rope extending along a torsion bar axis between first and second end fittings;
(b) first and second anchor assemblies, said first anchor assembly securing said first end fitting to said bumper, said second anchor assembly securing said second end fitting to said vehicle frame;
(c) said first anchor assembly, in cooperation with said second anchor assembly, for transmitting a torquing force from said bumper to said torsion bar in response to pivotal movement of said bumper between said closed and open positions; and,
(d) said second anchor assembly for restraining rotational movement of said second end fitting when said torquing force is transmitted to said torsion bar, said second anchor assembly permitting contraction of the length of said wire rope in response to said torquing force.

10. The combination as defined in claim 9, wherein said torsion bar is preloaded to apply to said bumper an angular return force towards said closed position.

11. The combination as defined in claim 10, wherein said wire rope has a defined length and a defined diameter, said length not substantially exceeding sixteen times said diameter.

12. The combination as defined in claim 11, wherein the diameter of said wire rope is substantially within the range of ⅞ inches to 1⅜ inches.

13. The combination as defined in claim 9, wherein said second anchor assembly comprises:
(a) an externally threaded stud axially aligned with said torsion bar axis and secured to said second end fitting;
(b) an adjustment screw;
(c) a torque locking block comprising first and second internally threaded bores extending into opposed ends of said block, each bore being axially aligned with said torsion bar axis,
  (i) said first and second bores axially communicating with each other;
  (i) said first bore threadably receiving said stud;
  (ii) said second bore threadably receiving said screw; and,
  (iii) said screw having a length sufficient to extend through said second bore into said first bore to an adjustable point limiting threading movement of said stud into said first bore; and,
(d) a support arm secured to said vehicle frame, said support arm including a collar holding said locking block in a manner permitting sliding movement of said block within said collar along said torsion bar axis while restraining pivotal movement of said block within said collar about said axis.

14. The combination as defined in claim 13, wherein said stud has a predetermined left hand or right hand thread and wherein said screw has a left hand or right hand thread opposite to that of said stud.

15. The combination as defined in claim 14, wherein the thread of said first bore is relatively coarse and the thread of said second bore is relatively fine.

16. The combination as defined in claim 9, wherein said first and second end fittings are swage fittings.

17. A torsion bar having a longitudinal axis, said torsion bar comprising a wire rope extending along said axis between first and second end fittings, said wire rope having a defined length and a defined diameter between said fittings, said length not substantially exceeding sixteen times said diameter, and wherein:
(a) said first end fitting is connectable with a first anchor assembly for securing said first end fitting to a component for transmitting a torquing force from said component to said torsion bar in response to pivotal movement of said component about said longitudinal axis;
(b) said second fitting is connectable with a second anchor assembly for restraining pivotal movement of said second end fitting when said torquing force is transmitted to said torsion bar.

18. A torsion bar as defined in claim 17, wherein said diameter of said wire rope is substantially within the range of ⅞ inches to 1⅜ inches.

19. A torsion bar as defined in claim 18 in combination with means for preloading said torsion bar.

20. A combination as defined in claim 19, wherein said means for preloading said torsion bar comprises:
  (a) an externally threaded stud axially aligned with said torsion bar axis and secured to said second end fitting;
  (b) an adjustment screw;
  (c) a torque locking block comprising first and second internally threaded bores extending into opposed ends of said block, each bore being axially aligned with said torsion bar axis,
    (i) said first and second bores axially communicating with each other;
    (i) said first bore threadably receiving said stud;
    (ii) said second bore threadably receiving said screw; and,
    (iii) said screw having a length sufficient to extend through said second bore into said first bore to an adjustable point limiting threading movement of said stud into said first bore; and,
  (d) an anchorable support arm, said support arm including a collar for holding said locking block in a manner permitting sliding movement of said block within said collar along said torsion bar axis while restraining pivotal movement of said block within said collar about said axis.

21. A combination as defined in claim 20, wherein said stud has a predetermined left hand or right hand thread and wherein said screw has a left hand or right hand thread opposite to that of said stud.

22. A combination as defined in claim 21, wherein the thread of said first bore is relatively coarse and the thread of said second bore is relatively fine.

23. A combination as defined in claim 19, wherein said first and second end fittings are swage fittings.

\* \* \* \* \*